(12) United States Patent
Lee

(10) Patent No.: US 8,745,176 B2
(45) Date of Patent: Jun. 3, 2014

(54) METHOD AND DEVICE TO SET DEVICE CONFIGURATIONS

(75) Inventor: Jong-nam Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 176 days.

(21) Appl. No.: 12/249,127

(22) Filed: Oct. 10, 2008

(65) Prior Publication Data
US 2009/0100155 A1  Apr. 16, 2009

(30) Foreign Application Priority Data
Oct. 10, 2007 (KR) ................. 10-2007-0102147

(51) Int. Cl.
*G06F 15/177* (2006.01)
*H04L 12/24* (2006.01)

(52) U.S. Cl.
CPC ............ H04L 41/08 (2013.01); H04L 41/0886 (2013.01)
USPC ......................................... 709/220; 709/221

(58) Field of Classification Search
CPC ............................ H04L 41/08; H04L 41/0886
USPC .................................................. 709/220, 221
See application file for complete search history.

(56) References Cited

U.S. PATENT DOCUMENTS

| | | | |
|---|---|---|---|
| 7,293,078 B2 * | 11/2007 | Danforth ....................... | 709/222 |
| 7,478,145 B2 * | 1/2009 | Braun et al. .................. | 709/220 |
| 7,648,070 B2 * | 1/2010 | Droms et al. ................. | 235/451 |
| 2003/0126243 A1 * | 7/2003 | Kudo et al. ................... | 709/222 |
| 2005/0060390 A1 * | 3/2005 | Vakil et al. .................... | 709/220 |
| 2005/0240665 A1 * | 10/2005 | Gu et al. ....................... | 709/220 |
| 2006/0004915 A1 * | 1/2006 | Cochran et al. .............. | 709/221 |
| 2006/0126585 A1 | 6/2006 | Kim et al. | |
| 2006/0155833 A1 * | 7/2006 | Matsuda et al. .............. | 709/220 |
| 2006/0220874 A1 * | 10/2006 | Campero et al. ........... | 340/572.7 |

FOREIGN PATENT DOCUMENTS

| | | |
|---|---|---|
| JP | 11-3314680 | 11/1999 |
| KR | 100574501 | 4/2006 |
| KR | 1020070014719 | 2/2007 |

OTHER PUBLICATIONS

Korean Office Action Issue don May 29, 2012 in KR patent Application No. 10-2007-0102147.

* cited by examiner

Primary Examiner — Asghar Bilgrami
(74) *Attorney, Agent, or Firm* — Stanzione & Kim, LLP

(57) ABSTRACT

A device to set device configurations, and a method thereof. The method includes requesting a server for address information to be used by a device and cloning information for setting configurations, and receiving the cloning information from the server according to the address information to be used by the device and setting configurations for the device. Accordingly, when a new device is installed, the method can receive device configuration information previously stored in a server that manages devices, and can automatically set configurations for the new device.

22 Claims, 5 Drawing Sheets

METHOD AND DEVICE TO SET DEVICE CONFIGURATIONS

CROSS-REFERENCE TO RELATED APPLICATIONS

This application claims priority under 35 U.S.C. §119(a) from Korean Patent Application No. 10-2007-0102147, filed on Oct. 10, 2007, in the Korean Intellectual Property Office, the disclosure of which is incorporated herein in its entirety by reference.

BACKGROUND OF THE INVENTION

1. Field of the Invention

The present general inventive concept relates to a method of setting device configurations without a manager's intervention when a device, e.g., a multifunctional device, is initially installed, in which the device actively requests information from a manager server, receives configuration information from the server such as information on a transmission control protocol/internet protocol (TCP/IP), a simple mail transfer protocol (SMTP) server, or a lightweight directory access protocol (LDAP) server, and automatically sets its configurations, and the device using the method.

2. Description of the Related Art

As demands for office automation (OA) devices, such as digital multifunctional devices, printers, scanners, copiers, and facsimile machines, have increased, requirements for the OA devices have also increased. A variety of OA devices, even tens to hundreds of OA devices, are used in an office. Accordingly, it has become important to maintain and manage the plurality of OA devices connected via a network, and the role of a device manager has expanded. In order to solve this problem, a manager server that manages different types of devices in the same library is being used.

FIG. 1 illustrates a plurality of multifunctional devices and a server connected to a network. The role of a manager expected when a new multifunctional device is added to existing multifunctional devices will now be explained. First, the manager sets transmission control protocol/internet protocol (TCP/IP) information of the new multifunctional device. In detail, the manager requests a bootstrap protocol/dynamic host configuration protocol (BOOTP/DHCP) server manager to assign an internet protocol (IP) to the new multifunctional device and receives the assigned IP when a BOOTP/DHCP is used, whereas the manager receives an IP from an IP resource manger when a static IP is used, and then the manager inputs the received IP into the new multifunctional device. Next, the manager sets basic configuration information related to copy, scan, and fax jobs. Next, the manager sets a lightweight directory access protocol (LDAP) server configuration in order to use an LDAP address book, sets a simple mail transfer protocol (SMTP) server configuration in order to use Scan-to-Email, sets a server message block/file transfer protocol (SMB/FTP) server configuration in order to use Scan-to-SMB/FTP, and sets a user authentication configuration in order to restrict access of a multifunctional device user.

The creation of identical copies of configuration information set for one device is referred to as cloning. In general, cloning is performed as follows. First, configuration information of a source device is copied and exported to a manger server. The manager server selects target devices. The selected target devices import the configuration information, and the configuration information is set for the target devices.

In cloning using a conventional server, TCP/IP information must be basically set for a network multifunctional device.

Also, since the cloning using the conventional server determines whether there is a new multifunctional device by periodically monitoring a network, a manager who manages a plurality of devices must continuously monitor whether target devices are connected to the network. Accordingly, whenever a new multifunctional device is added to the network, the manager must connect the new multifunctional device to the network, set TCP/IP configuration values, and perform cloning using a manager server. Hence, the manager should set configurations for the new multifunctional device as well as managing the existing multifunctional devices.

There are several methods, such as universal plug and play (UPnP) and service location protocol (SLP), which are used to announce services on a network after IP information is set. However, since the goals of the methods are to announce the services on the network, although central management software finds the location of the new multifunctional device using the methods, the central management software cannot judge whether the new multifunctional device desires cloning.

Accordingly, even though both the protocols UPnP and SLP and the cloning are used, a so-called plug-and-clone function without a manager's intervention cannot be achieved.

SUMMARY OF THE INVENTION

The present general inventive concept provides a method and device for setting device configurations without a manger's intervention, which can receive device configuration information, which is previously stored in a manager server, and can automatically set configurations for a new device.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method of setting device configurations, the method including requesting a server for address information to be used by a device and cloning information for setting configurations for the device, and receiving the cloning information from the server according to the address information to be used by the device and setting configurations for the device.

The foregoing and/or other aspects and utilities of the general inventive concept may also be achieved by providing a device to set device configurations, the device including a request signal generating unit to generate a request signal that requests address information to be used by the device and cloning information for setting configurations, an interface unit to transmit the generated request signal to a manager server, and to receive the address information and the cloning information from the manager server, and a configuration setting control unit to control configuration setting for the device using the received address information and cloning information.

The foregoing and/or other aspects and utilities of the general inventive concept may also be achieved by providing a computer readable medium having embodied thereon a computer program to execute a method of setting device configurations, the method including requesting a server for address information to be used by a device and cloning information for setting configurations for the device, and receiving the cloning information from the server according to the address information to be used by the device and setting one or more configurations for the device.

The foregoing and/or other aspects and utilities of the general inventive concept may also be achieved by providing a method of setting configurations for a device, the method including coupling the device to a communications network, transmitting a request signal requesting address information and cloning information for the device, receiving the address information to be used by the device from a server communicatively coupled to the communications network, receiving the cloning information from the server based at least in part on the received address information for the device, and setting one or more configurations for the device based at least in part on the received cloning information.

The foregoing and/or other aspects and utilities of the general inventive concept may also be achieved by providing a computer readable medium having embodied thereon a computer program to execute a method of setting configurations for a device, the method including coupling the device to a communications network, transmitting a request signal requesting address information and cloning information for the device, receiving the address information to be used by the device from a server communicatively coupled to the communications network, receiving the cloning information from the server based at least in part on the received address information for the device, and setting one or more configurations for the device based at least in part on the received cloning information.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
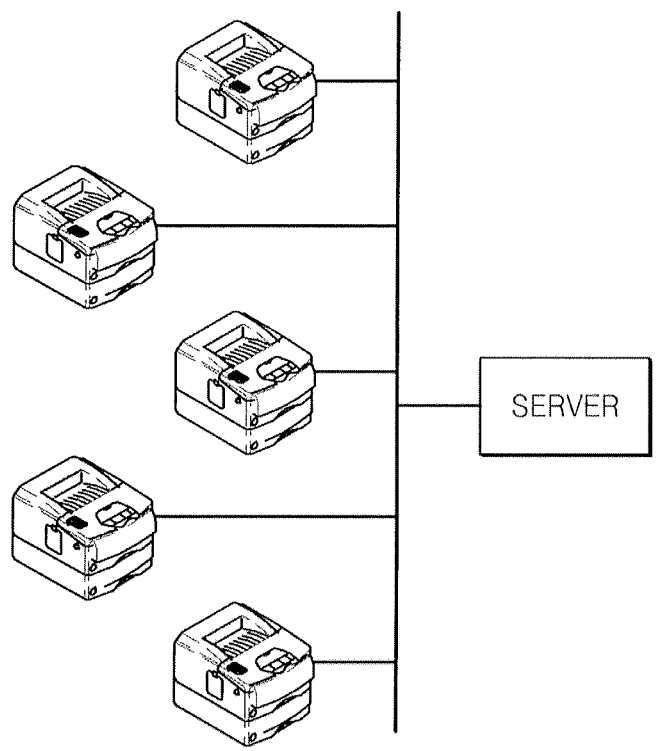
FIG. 1 illustrates a plurality of multifunctional devices and a manager server connected to a network.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
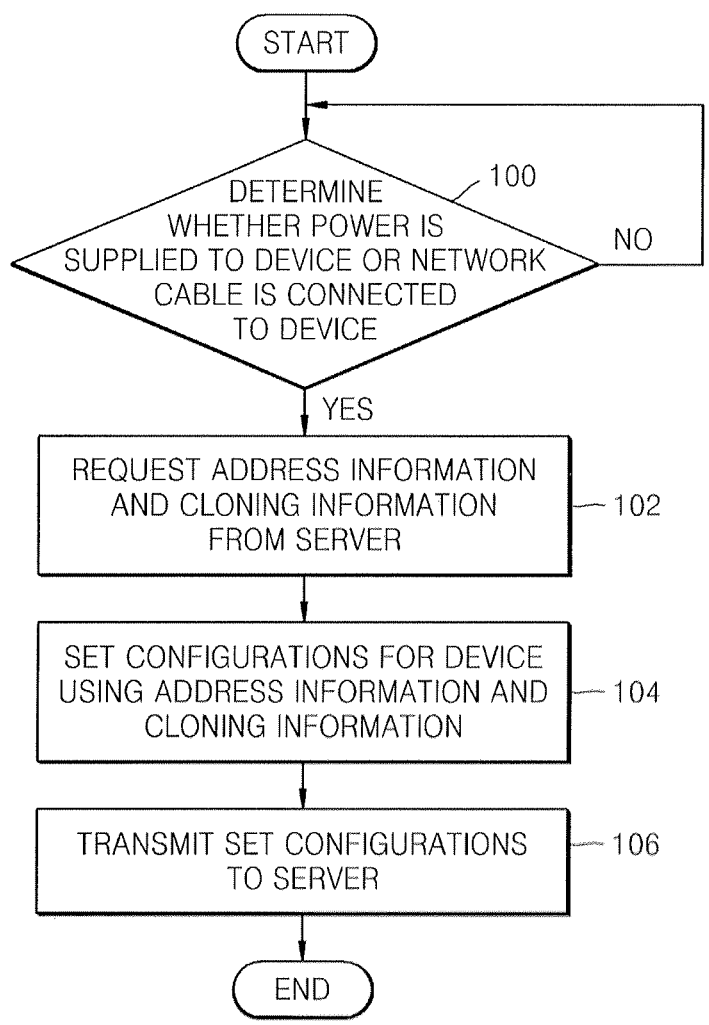
FIG. 2 is a flowchart illustrating a method of setting device configurations according to an embodiment of the present general inventive concept.

FIG. 2 is a flowchart illustrating a method of setting device configurations according to an embodiment of the present general inventive concept.

In operation 100, it is determined whether power is supplied to a device to be installed or a network cable is connected to the device. In detail, it is determined whether power for driving the device is supplied to the device and the network cable for communication, such as a local area network (LAN) cable, is connected to the device.

If it is determined in operation 100 that the power is supplied to the device and the network cable is connected to the device, a request signal requesting address information to be used by the device and cloning information for setting configurations is automatically broadcast to a server at operation 102. The server receives the broadcast request signal, and in response to the request signal for the address information, the server transmits address information to be assigned to the device, and then transmits cloning information to the device according to the address information.

Configurations for the device are set using the address information and the cloning information received from the server at operation 104.

The cloning information includes basic configuration information, lightweight directory access protocol (LDAP) configuration information, simple mail transfer protocol (SMTP) configuration information, server message block/file transfer protocol (SMB/FTP) configuration information, and/or user authentication configuration information for the device, or any other suitable information, or any combination thereof. If the device is a multifunctional device, the basic configuration information may include information on copy, scan, and/or fax jobs, or any combination thereof. The LDAP configuration information is protocol information used to find locations of resources (such as files or devices) on a network by accessing an LDAP address book. The SMTP configuration information is standard protocol information used to transfer an electronic mail (e-mail) through the Internet for using Scan-to-Email. The SMB/FTP configuration information is information used for Scan-to-SMB/FTP. The user authentication configuration information is information used to restrict access of a multifunctional device user.

Figure 3:
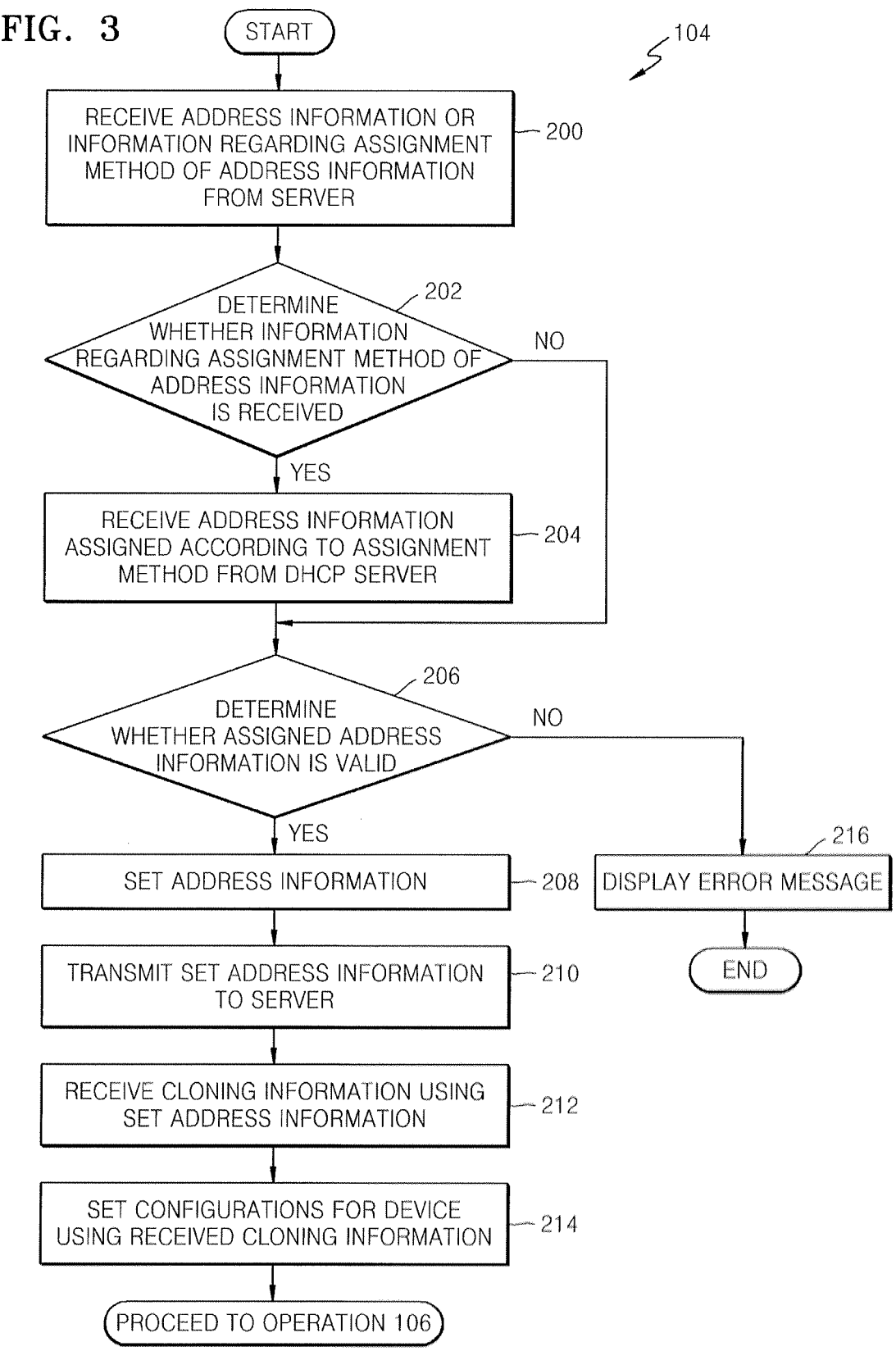
FIG. 3 is a flowchart illustrating an operation in which configurations for a device are set using address information and cloning information received from a server, as illustrated in FIG. 2.

FIG. 3 is a flowchart illustrating operation 104 of the method of FIG. 2.

The address information is received from the server at operation 200. In detail, the server receiving the broadcast request signal broadcasts address information to be assigned to the device, in response to the request signal. At this time, the server adds identification (ID) information, such as information on a media access control (MAC) address or a serial number, to the address information and broadcasts a signal including the address information and the ID information to the device so that the device can receive the broadcast signal.

The server may broadcast information regarding an assignment method of the address information to be assigned to the device, instead of directly transmitting the address information to the device. The device receives the address information or the information regarding the assignment method of the address information broadcast from the server according to whether the ID information, such as information on the MAC address or the serial number, corresponds to the device.

In operation 202, it is determined whether the information regarding the assignment method of the address information is received.

If it is determined in operation 202 that the information regarding the assignment method of the address information is received, address information assigned according to the assignment method is received at operation 204. An example of the assignment method of the address information is a method of receiving assigned address information from a dynamic host configuration protocol (DHCP) server. The DHCP server is a server that automatically assigns and manages setting information necessary for executing transmission control protocol/internet protocol (TCP/IP) communication. The device receives address information assigned by the DHCP server.

In operation 206, it is determined whether the assigned address information is valid, or invalid due to the address information assigned by the server or the DHCP server causing a collision.

If it is determined in operation 206 that the assigned address information is valid, the valid address information is set as address information for the device at operation 208.

In operation 210, the set address information is transmitted to the server. The server transmits cloning information to the device, in response to the set address information.

In operation 212, the cloning information is received according to the address information set for the device.

In operation 214, configurations for the device are set using the received cloning information. The device set its configurations using the cloning information provided from the server. The set configurations include a basic configuration, an LDAP configuration, a SMTP configuration, a SMB/FTP configuration, and a user authentication configuration for the device.

If it is determined in operation 206, however, that the assigned address information is invalid, an error message is displayed at operation 216. If the address information assigned by the server or the DHCP server is invalid due to the address information causing a collision, an error message indicating that the assigned address message is invalid is displayed to the user. The error message may be displayed on the device, or may be transmitted to the server.

Turning again to FIG. 2, the set configurations for the device are transmitted to the server at operation 106. The device transmits the set configurations to the server so that the server can recognize the configurations set for the device.

Figure 4:
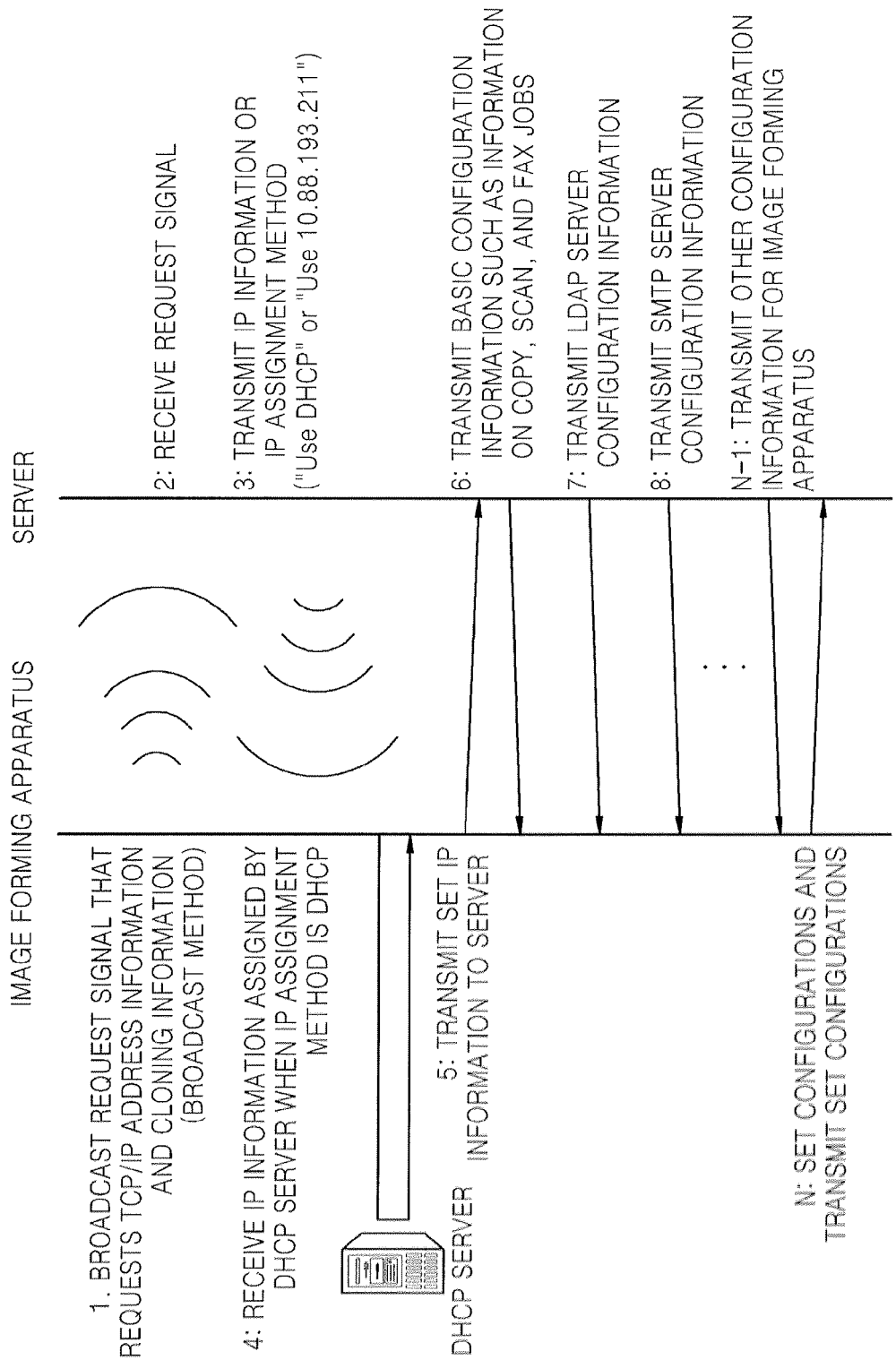
FIG. 4 is a view for illustrating a method of setting configurations for an image forming apparatus.

FIG. 4 is a view for illustrating a method of setting configurations for an image forming apparatus.

The image forming apparatus broadcasts a request signal requesting TCP/IP address information and cloning information to a server through a wired or wireless communication at operation 1. The server receives the request signal at operation 2. The server broadcasts IP address information or information regarding an IP address assignment method to the image forming apparatus through a wired or wireless communication at operation 3. For example, as illustrated in FIG. 4, the transmitted assignment method may be to use DCHP or may be a specific IP address (e.g., use 10.88.193.211). The image forming apparatus receiving the IP address assignment method receives IP address information assigned according to the assignment method at operation 4. The image forming apparatus sets the assigned IP address information and transmits the set IP address information to the server at operation 5. The server transmits the cloning information requested by the image forming apparatus to the image forming apparatus at operations 6, 7, 8, and N-1. The cloning information includes basic configuration information regarding copy, scan, and fax jobs (e.g., at operation 6), LDAP configuration information (e.g., at operation 7), or SMTP configuration information (e.g., at operation 8), or any other configuration information (e.g., at operation N-1). The image forming apparatus sets its configurations according to the configuration information provided from the server (e.g., from operations 6, 7, 8, and/or N-1), and transmits the set configurations to the server at operation N. The aforementioned method of setting device configurations may be embodied as computer-readable codes/instructions/programs. That is, a computer-readable recording medium records a program for executing a method of setting configurations for a device, the method including requesting address information to be used by the device and cloning information for setting configurations, and receiving the cloning information from the server according to the address information and setting configurations for the device.

For example, the present general inventive concept may be embodied in a general purpose digital computer by running a program from a computer-readable medium. The computer-readable medium can include a computer-readable recording medium and a computer-readable transmission medium. Examples of the computer-readable recording medium include storage media such as magnetic storage media (e.g., read only memories (ROMs), floppy discs, or hard discs), optically readable media (e.g., compact disk-read only memories (CD-ROMs), or digital versatile disks (DVDs)). The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Embodiments of the present general inventive concept may be embodied as a medium (media) having a computer-readable code embodied therein for causing a number of computer systems connected via a network to effect distributed processing. Functional programs, codes, and code segments for embodying the present general inventive concept may be easily deduced by programmers in the art which the present general inventive concept belongs to.

A device according to an embodiment of the present general inventive concept will now be explained in detail with reference to FIG. 5.

Figure 5:
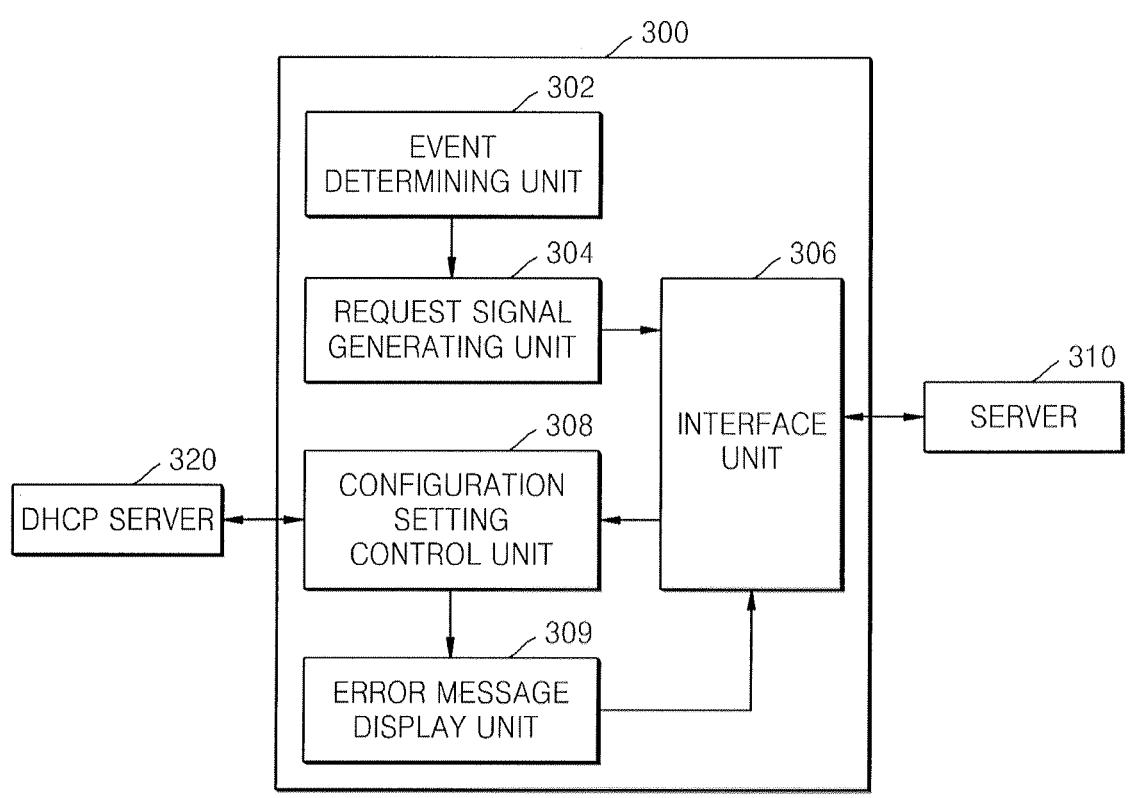
FIG. 5 illustrates a block diagram of a device according to an embodiment of the present general inventive concept.

FIG. 5 illustrates a block diagram of a device 300 according to an embodiment of the present general inventive concept. Referring to FIG. 5, the device 300, a server 310 and a DHCP server 320 are illustrated. In particular, the device 300 includes an event determining unit 302, a request signal generating unit 304, an interface unit 306, a configuration setting control unit 308, and an error message display unit 309.

The event determining unit 302 determines whether power is supplied to the device 300 and a network cable is connected to the device 300, and outputs the determination result to the request signal generating unit 304.

The request signal generating unit 304 generates a request signal to request address information to be assigned to the device 300 and cloning information used to set configurations, in response to the determination result of the event determining unit 302 indicating that the power is supplied to the device 300 or the network cable is connected to the device 300, and then the request signal generating unit 304 outputs the generated request signal to the interface unit 306. If it is determined that the power for driving the device 300 is supplied to the device 300 and the network cable for communication, for example, a LAN cable, is connected to the device 300, the request signal generating unit 304 automatically generates a request signal.

The interface unit 306 transmits the request signal generated by the request signal generating unit 304 to the server 310. The interface unit 306 broadcasts the request signal to the server 310, which is communicatively coupled to device 300 via a wired or wireless communications link.

The server 310 receives the broadcast request signal. The server 310 broadcasts address information to be assigned to the device 300 and cloning information to the device 300, in response to the request signal. The manager server 310 may broadcast information regarding an address assignment method, instead of the address information, to the device 300. The server 310 adds ID information, such as information on a MAC address or a serial number, to the address information and broadcasts a signal including the address information with the ID information so that the device 300 can receive the broadcast signal.

The interface unit 306 receives the address information, the information regarding the address assignment method, and the cloning information from the server 310. The interface unit 306 determines whether the ID information received along with the address information corresponds to the device 300 and receives the signal broadcast from the server 310.

The configuration setting control unit 308 controls configuration setting for the device using the received address information and cloning information. The cloning information includes basic configuration information, LDAP configuration information, SMTP configuration information, SMB/FTP configuration information, and user authentication configuration information for the device 300. The configuration setting control unit 308 determines whether the assigned address information is valid or invalid due to the address information assigned by the server or the DHCP serve causing a collision.

The configuration setting control unit 308 controls setting of the address information assigned according to the assignment method when the information regarding the address assignment method is received. For example, if the assignment method is a method of receiving address information from a DHCP server 320, the configuration setting control unit 308 requests the DHCP server 320 to assign address information, and sets the address information assigned by the DHCP server 320 as address information for the device 300. Also, the configuration setting control unit 308 sets a basic configuration, an LDAP configuration, and an SMTP configuration for the device 300 using the cloning information provided by the server 310. Next, the configuration setting control unit 308 transmits the set configurations to the server 310.

If the address information assigned by the server 310 and the DHCP server 320 is invalid, the error message display unit 309 displays an error message indicating that the assigned address information is invalid to a user. The error message display unit 309 may display the error message on the device 300, or transmit the error message to the server 310 through the interface unit 306.

Examples of the device 300 include an image forming apparatus such as a printer, a multifunctional device, a copier, or a facsimile.

When a new device is installed and/or is connected to a communications network through a wired or wireless communication, the present general inventive concept can receive device configuration information previously stored in a manager server, and can automatically set configurations for the new device, without a manager's intervention. Accordingly, it is unnecessary for the manager to intervene to set IP address and configuration information whenever a new device is purchased. Only if the manager stores device configuration information in the manager server, can the present general inventive concept automatically set configurations for the new device in a convenient manner.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. A method of setting device configurations, the method comprising:

determining whether power is supplied to the device, and requesting a server for address information to be used by a device and cloning information for setting configurations for the device from the server when it is determined that the power is supplied;

receiving broadcast information from the server, including:
    receiving assignment instructions that are broadcast from the server for the address information for the device; and
    receiving the address information assigned to the device according to the received assignment instructions and setting the address information in the device;

transmitting the set address information to the server; and receiving the cloning information from the server according to the set address information and setting one or more configurations for the device, wherein the cloning information includes basic configuration information, lightweight directory access protocol (LDAP) configuration information, simple mail transfer protocol (SMTP) configuration information, server message block/file transfer protocol (SMB/FTP) configuration information, and user authentication configuration information for the device.

2. The method of claim 1, wherein the requesting the server further comprises:
    broadcasting a request signal requesting the address information and the cloning information.

3. The method of claim 1, wherein the receiving of the cloning information and the setting of the configurations for the device comprises:
    setting at least one of the one or more configurations for the device using the received cloning information.

4. The method of claim 1, wherein the receiving of the address information assigned according to the received assignment instructions comprises:
    receiving the address information assigned by a dynamic host configuration protocol (DHCP) server.

5. The method of claim 3, further comprising:
    displaying an error message when an error occurs.

6. The method of claim 1, further comprising:
    determining whether a network cable is connected to the device.

7. The method of claim 6, further comprising:
    when it is determined that the network cable is connected to the device, automatically requesting the address information and the cloning information for the device from the server.

8. The method of claim 1, further comprising transmitting the set configurations to the server.

9. A device to set device configurations, the device comprising:
    a request signal generating unit to generate a request signal that requests address information to be used by the device and cloning information for setting configurations of the device;
    an interface unit to transmit the generated request signal to a manager server, and to receive broadcast information from the server including assignment instructions for the address information of the device, to receive address information assigned to the device according to the received assignment instructions, to transmit set address information to the server, and to receive the cloning information from the manager server; and
    a configuration setting control unit to control configuration setting for the device using the cloning information received according to the set address information;

an event determining unit to determine whether power is supplied to the device, where the request signal generating unit automatically generates the request signal when it is determined that the power is supplied to the device, wherein the cloning information includes basic configuration information, lightweight directory access protocol (LDAP) configuration information, simple mail transfer protocol (SMTP) configuration information, server message block/file transfer protocol (SMB/FTP) configuration information, and user authentication configuration information for the device.

10. The device of claim 9, wherein the interface unit broadcasts the request signal.

11. The device of claim 9, wherein the configuration setting control unit receives the address information assigned by a dynamic host configuration protocol (DHCP) server.

12. The device of claim 9, wherein the configuration setting control unit transmits set configurations of the device to the server.

13. The device of claim 9, wherein the event determining unit determines a network cable is connected to the device, wherein, when it is determined that the network cable is connected to the device, the request signal generating unit automatically generates the request signal.

14. The device of claim 9, wherein the device is an image forming apparatus.

15. The device of claim 9, further comprising an error message display unit to display an error message when an error occurs during the configuration setting for the device.

16. A non-transitory computer readable medium having embodied thereon a computer program to execute a method of setting device configurations, the method comprising:

determining whether power is supplied to the device, and requesting a server for address information to be used by a device and cloning information for setting configurations for the device from the server when it is determined that the power is supplied; and receiving broadcast information from the server, including:

receiving assignment instructions that are broadcast from the server for the address information for the device; and receiving the address information assigned to the device according to the received assignment instructions and setting the address information in the device;

transmitting the set address information to the server; and receiving the cloning information from the server according to the set address information and setting one or more configurations for the device, wherein the cloning information includes basic configuration information, lightweight directory access protocol (LDAP) configuration information, simple mail transfer protocol (SMTP) configuration information, server message block/file transfer protocol (SMB/FTP) configuration information, and user authentication configuration information for the device.

17. A method of setting configurations for a device, the method comprising:

coupling the device to a communications network;
determining whether power is supplied to the device;
automatically transmitting a request signal requesting address information and cloning information for the device when it is determined that the power is supplied;

receiving broadcast information from a server communicatively coupled to the communications network, the broadcast information including address assignment instructions;

assigning an address for the device based at least in part on the received address assignment instructions and setting the address information of the device;

transmitting the set address information to the server;

receiving the cloning information from the server based at least in part on the set address information for the device; and setting one or more configurations for the device based at least in part on the received cloning information, wherein the cloning information includes basic configuration information, lightweight directory access protocol (LDAP) configuration information, simple mail transfer protocol (SMTP) configuration information, server message block/file transfer protocol (SMB/FTP) configuration information, and user authentication configuration information for the device.

18. The method of claim 17, further comprising:
transmitting the one or more set configurations for the device to the server.

19. The method of claim 17, further comprising:
determining if the assigned address for the device is valid.

20. A non-transitory computer readable medium having embodied thereon a computer program to execute a method of setting configurations for a device, the method comprising:

coupling the device to a communications network;
determining whether power is supplied to the device;
automatically transmitting a request signal requesting address information and cloning information for the device when it is determined that the power is supplied;

receiving broadcast information from a server communicatively coupled to the communications network, the broadcast information including address assignment instructions;

assigning an address for the device based at least in part on the received address assignment instructions and setting the address information of the device;

transmitting the set address information to the server;

receiving the cloning information from the server based at least in part on the set address information for the device; and setting one or more configurations for the device based at least in part on the received cloning information, wherein the cloning information includes basic configuration information, lightweight directory access protocol (LDAP) configuration information, simple mail transfer protocol (SMTP) configuration information, server message block/file transfer protocol (SMB/FTP) configuration information, and user authentication configuration information for the device.

21. A method of setting configurations for a device, the method comprising:

determining whether power is supplied to the device;
automatically transmitting a request signal from the device to a server for address information to be used by a device and cloning information for setting configurations for the device from the server when it is determined that the power is supplied;

receiving broadcast information from the server, the broadcast information including address assignment instructions;

assigning an address for the device based at least in part on the received address assignment instructions and setting the address information of the device;

transmitting the set address information to the server; and setting one or more configurations of the device according to the cloning information that is received from the server based at least in part on the set address information for the device, wherein the cloning information includes basic configuration information, lightweight directory access protocol (LDAP) configuration information, simple mail transfer protocol (SMTP) configuration information, server message block/file transfer protocol (SMB/FTP) configuration information, and user authentication configuration information for the device.

22. A device coupled to a communications network and a server, the device comprising:

an event determining unit to determine whether power is supplied to the device;

a transmitter to transmit a request signal from the device to the server for address information to be used by a device and cloning information for setting configurations for the device from the server when it is determined that the power is supplied;

a receiver to receiving broadcast information from the server, the broadcast information including address assignment instructions; and a controller to assign an address for the device based at least in part on the received address assignment instructions, set the address information of the device, and to set one or more configurations of the device according to the cloning information that is received from the server, wherein the cloning information includes basic configuration information, lightweight directory access protocol (LDAP) configuration information, simple mail transfer protocol (SMTP) configuration information, server message block/file transfer protocol (SMB/FTP) configuration information, and user authentication configuration information for the device.

* * * * *